United States Patent
Nakamura et al.

(10) Patent No.: US 8,907,190 B2
(45) Date of Patent: Dec. 9, 2014

(54) SWITCH DEVICE AND ELECTRONIC MUSICAL INSTRUMENT

(71) Applicant: Casio Computer Co., Ltd., Tokyo (JP)

(72) Inventors: Makoto Nakamura, Musashino (JP); Akira Sakashita, Kawasaki (JP)

(73) Assignee: Casio Computer Co., Ltd., Tokyo (JP)

( * ) Notice: Subject to any disclaimer, the term of this patent is extended or adjusted under 35 U.S.C. 154(b) by 17 days.

(21) Appl. No.: 13/649,293

(22) Filed: Oct. 11, 2012

(65) Prior Publication Data

US 2013/0092011 A1    Apr. 18, 2013

(30) Foreign Application Priority Data

Oct. 13, 2011    (JP) .................................. 2011-225813

(51) Int. Cl.
*G10C 3/12*    (2006.01)
*G10H 7/00*    (2006.01)
(Continued)

(52) U.S. Cl.
CPC . *G10H 1/34* (2013.01); *G10H 7/04* (2013.01); *G10H 1/346* (2013.01); *G06F 3/03543* (2013.01); *G06F 3/0362* (2013.01); *G10C 3/12* (2013.01); *G06F 3/0213* (2013.01); *H01H 19/001* (2013.01); *G05G 9/04* (2013.01); *H01H 19/14* (2013.01); *H01H 19/16* (2013.01); *H01H 2019/146* (2013.01); *G05G 1/04* (2013.01)
USPC ............ 84/423 R; 84/605; 200/5 A; 345/157; 345/163; 345/167; 400/472

(58) Field of Classification Search
CPC ........... G10C 3/12; G10H 1/346; G10H 7/04; G10H 1/34; H01H 19/16; H01H 19/14; H01H 19/001; H01H 2019/146; G06F 3/0362; G06F 3/0213; G06F 3/03543; G05G 9/04; G05G 1/04

USPC ......... 84/423 R, 605; 200/5 A; 345/157, 163, 345/167; 400/472

See application file for complete search history.

(56) References Cited

U.S. PATENT DOCUMENTS 4,982,618 A * 1/1991 Culver ...................... 74/471 XY
5,270,692 A * 12/1993 Rockwell ...................... 345/163
(Continued)

FOREIGN PATENT DOCUMENTS

| JP | 2002-342013 A | 11/2002 | |
|---|---|---|---|
| JP | 2002342013 A | * 11/2002 | .............. G06F 3/023 |
| JP | 2010-234012 A | 10/2010 | |

OTHER PUBLICATIONS

Japanese Office Action dated Aug. 26, 2013 (and English translation thereof) in counterpart Japanese Application No. 2011-225813.

*Primary Examiner* — David Warren
*Assistant Examiner* — Christina Russell
(74) *Attorney, Agent, or Firm* — Holtz, Holtz, Goodman & Chick PC

(57) ABSTRACT

The present invention includes a first rotating operation unit which is arranged in one end section of an instrument main body such that a portion thereof protrudes from the top surface of the instrument main body, and switch-operated by the protruding portion being rotated by the thumb of a left hand, and a second rotating operation unit which is arranged posterior to the first rotating operation unit such that a portion thereof is exposed on a side surface side of the end section, and switch-operated by the exposed portion being rotated by a finger other than the thumb. Accordingly, when the left hand is placed on the end section, the thumb is placed corresponding to the first rotating operation unit, and the other finger is placed corresponding to the second rotating operation unit, whereby these rotating operation units can be rotated separately by only the left hand.

6 Claims, 13 Drawing Sheets

(51) Int. Cl.

| | |
|---|---|
| *H01H 13/70* | (2006.01) |
| *H01H 13/76* | (2006.01) |
| *G06F 3/033* | (2013.01) |
| *B41J 5/00* | (2006.01) |
| *G10H 7/04* | (2006.01) |
| *G10H 1/34* | (2006.01) |
| *G06F 3/0354* | (2013.01) |
| *G06F 3/0362* | (2013.01) |
| *G06F 3/02* | (2006.01) |
| *H01H 19/00* | (2006.01) |
| *G05G 9/04* | (2006.01) |
| *H01H 19/14* | (2006.01) |
| *H01H 19/16* | (2006.01) |
| *G05G 1/04* | (2006.01) |

(56) References Cited

U.S. PATENT DOCUMENTS

| | | | |
|---|---|---|---|
| 5,543,821 A * | 8/1996 | Marchis et al. | 345/167 |
| 6,056,458 A * | 5/2000 | Lin | 400/477 |
| 6,198,055 B1 * | 3/2001 | Hughes | 200/14 |
| 6,340,800 B1 * | 1/2002 | Zhai et al. | 200/5 R |
| 6,580,420 B1 * | 6/2003 | Wang | 345/163 |
| 6,590,564 B1 * | 7/2003 | McLoone et al. | 345/167 |
| 6,853,290 B2 * | 2/2005 | Jorgensen et al. | 338/200 |
| 7,042,441 B2 * | 5/2006 | Adams et al. | 345/163 |
| 7,187,358 B2 * | 3/2007 | Ledbetter et al. | 345/156 |
| 7,229,227 B2 * | 6/2007 | McLoone et al. | 400/489 |
| 7,463,239 B2 * | 12/2008 | Ledbetter et al. | 345/156 |
| 7,702,406 B2 * | 4/2010 | Hatanaka et al. | 700/94 |
| 2003/0098849 A1 * | 5/2003 | Jzuhsiang | 345/163 |
| 2005/0068299 A1 * | 3/2005 | Ore-Yang | 345/164 |
| 2006/0022521 A1 * | 2/2006 | Szczerba et al. | 303/191 |
| 2006/0238506 A1 * | 10/2006 | Yen | 345/163 |
| 2007/0020013 A1 * | 1/2007 | McAlindon | 400/489 |
| 2007/0227862 A1 * | 10/2007 | Yim et al. | 200/51.09 |
| 2008/0010616 A1 * | 1/2008 | Algreatly | 715/856 |
| 2008/0207281 A1 * | 8/2008 | Tsuchiya et al. | 455/575.1 |
| 2010/0066706 A1 * | 3/2010 | Chen et al. | 345/184 |
| 2011/0235039 A1 * | 9/2011 | Jung et al. | 356/402 |

* cited by examiner

SWITCH DEVICE AND ELECTRONIC MUSICAL INSTRUMENT

CROSS-REFERENCE TO RELATED APPLICATION

This application is based upon and claims the benefit of priority from the prior Japanese Patent Application No. 2011-225813, filed Oct. 13, 2011, the entire contents of which is incorporated herein by reference.

BACKGROUND OF THE INVENTION

1. Field of the Invention

The present invention relates to a switch device for musical instruments such as a keyboard instrument, a string instrument, or a wind instrument, and audio equipment such as a music player, and an electronic musical instrument including this switch device. Specifically, the present invention relates to a rotary switch device that gives an effect to musical sound and an electronic musical instrument including this switch device.

2. Description of the Related Art

A rotary switch device for a music player is known which is structured such that a rotation shaft is provided in its device case, a rotating operation member is attached to the rotation shaft, and a pitch-bend switch section is provided in the rotating operation member, as described in Japanese Patent Application Laid-Open (Kokai) Publication No. 2010-234012. In this rotary switch device, a pitch-bend operation is performed by rotating the rotating operation member while pressing the switch section, and a scratch operation is performed by rotating the rotating operation member without pressing the switch section.

In this rotary switch device, the rotating operation member includes a rotation disk and a board supporting plate. In this instance, a through hole is formed in the rotation disk, and a key top is provided in the through hole. In addition, a switch board is provided in the board supporting plate, and a switch section is provided in the switch board corresponding to the key top.

When performing a pitch-blend operation in this type of switch device, the rotating operation member is rotated in the condition where the switch section of the rotating operation member is turned ON by pressing the key top. When performing a scratch operation, the rotating operation member is rotated in the condition where the switch section of the rotating operation member is turned OFF by not pressing the key top.

However, in such a rotary switch device, the pitch-bend operation of rotating the rotating operation member in the condition where the switch section of the rotating operation member is turned ON by pressing the key top cannot be simultaneously performed with the scratch operation of rotating the rotating operation member in the condition where the switch section of the rotating operation member is turned OFF by not pressing the key top. Therefore, there is a problem in that this type of switch device is not user-friendly.

SUMMARY OF THE INVENTION

An object of the present invention is to provide a switch device by which operations of two switches can be simultaneously performed with one hand, and an electronic musical instrument including this switch device.

In order to achieve the above-described object, in accordance with one aspect of the present invention, there is provided a switch device comprising: a first rotating operation unit which is rotatably arranged in one end section of a device case such that a first portion thereof is exposed on a top surface of the device case; and a second rotating operation unit which is rotatably arranged in one end section of the device case such that a second portion thereof is exposed on a side surface of the one end section, and positioned such that the second portion is rotatable in a horizontal direction by a finger of one hand other than a thumb when the first portion of the first rotating operation unit is rotated in an up and down direction by the thumb.

In accordance with another aspect of the present invention, there is provided a switch device comprising: a first rotating operation unit which is rotatably arranged in one end section of an instrument case such that a first portion thereof is exposed on a top surface of the instrument case; and a second rotating operation unit which is rotatably arranged in one end section of the instrument case such that a second portion thereof is exposed on a side surface of the one end section, and positioned such that the second portion is rotatable in a horizontal direction by a finger of one hand other than a thumb when the first portion of the first rotating operation unit is rotated in an up and down direction by the thumb.

In accordance with another aspect of the present invention, there is provided an electronic musical instrument comprising: a keyboard section; an instrument case which houses the keyboard section; a first rotating operation unit which is rotatably arranged in one end section of the instrument case such that a first portion thereof is exposed on a top surface of the instrument case; a second rotating operation unit which is rotatably arranged in one end section of the instrument case such that a second portion thereof is exposed on a side surface of the one end section, and positioned such that the second portion is rotatable in a horizontal direction by a finger of one hand other than a thumb when the first portion of the first rotating operation unit is rotated in an up and down direction by the thumb; and a musical sound generating section which is housed in the instrument case, generates predetermined musical sound in response to a key depression operation on the keyboard section, adds an effect to the musical sound in response to operation of at least one of the first rotating operation unit and the second rotating operation unit, and outputs the musical sound.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 6A and FIG. 6B are diagrams showing the first rotating operation unit of the switch device shown in FIG. 4, of which FIG. 6A is an enlarged front view thereof and FIG. 6B is an enlarged planar view thereof;

FIG. 10A and FIG. 10B are diagrams showing the second rotating operation unit of the switch device shown in FIG. 4, of which FIG. 10A is an enlarged front view thereof and FIG. 10B is an enlarged planar view thereof;

DETAILED DESCRIPTION OF THE PREFERRED EMBODIMENTS

An embodiment in which the present invention has been applied to an electronic keyboard instrument will hereinafter be described with reference to FIG. 1 to FIG. 11 and FIG. 13.

Figure 1:
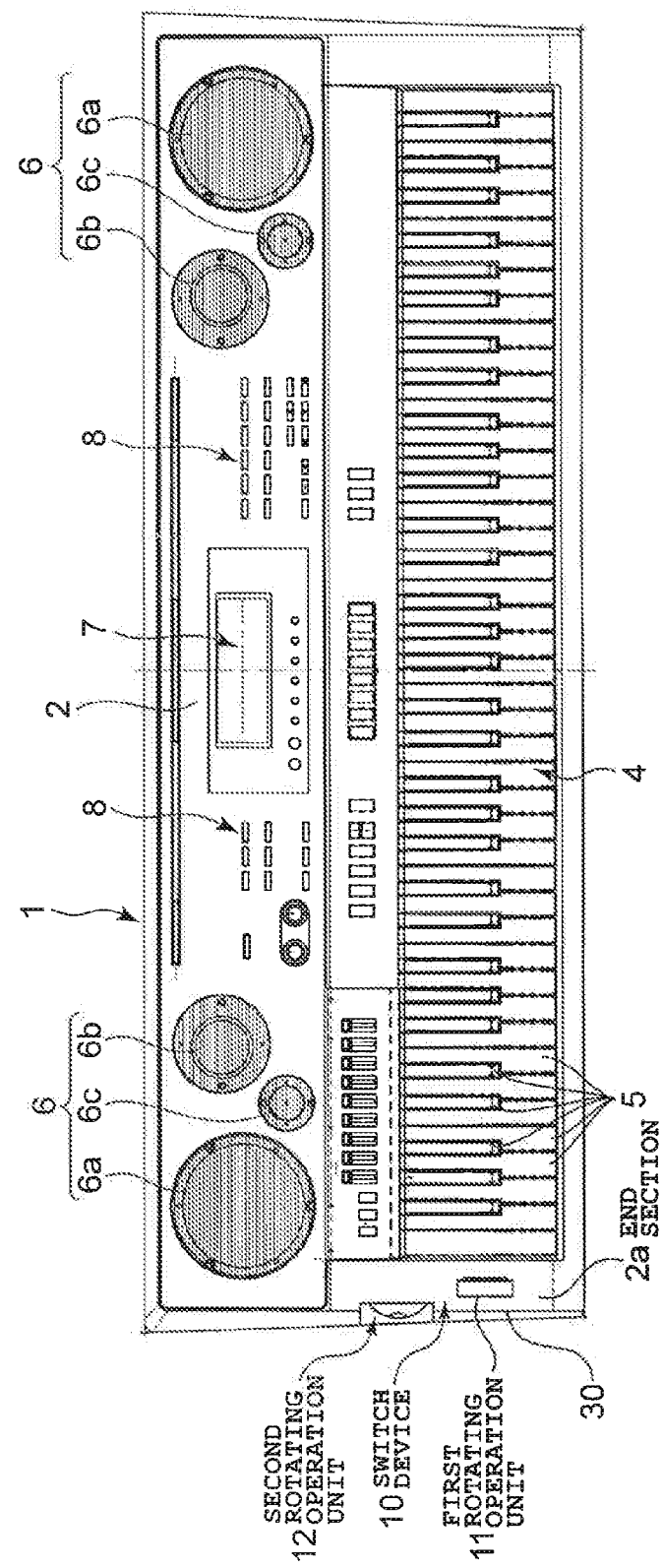
FIG. 1 is a planar view of an embodiment in which the present invention has been applied to a keyboard instrument.
Figure 2:
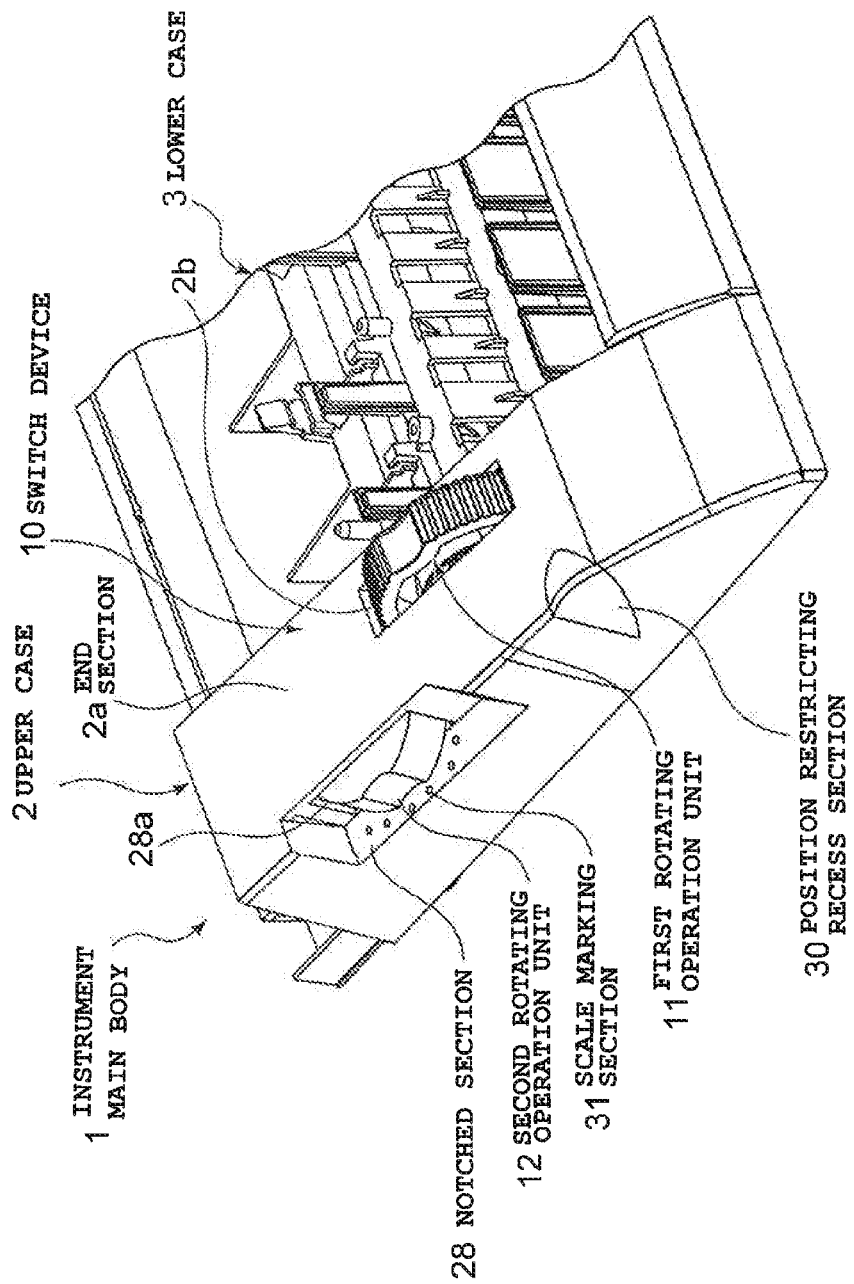
FIG. 2 is an enlarged perspective view showing the main section of a side portion on the left-hand side of the upper case of the keyboard instrument shown in FIG. 1.

This electronic keyboard instrument includes an instrument main body 1, as shown in FIG. 1 and FIG. 2. The instrument main body 1 includes an upper case 2 and a lower case 3 in which a keyboard section 4 is provided.

The keyboard section 4 includes a plurality of keys 5 constituted by white keys and black keys, as shown in FIG. 1. These keys 5 are arrayed in parallel within the instrument main body 1 and rotate in an up and down direction. In this instance, the upper case 2 is provided above the lower case 3 to be positioned posterior to the keyboard section 4 (the upper edge side in FIG. 1) and to the sides of the keyboard section 4 in the array direction (the left and right direction in FIG. 1) of the keys 5. As a result, the keyboard section 4 is, except for its rear end portion, exposed upward without being covered by the upper case 2.

The upper case 2 is provided with a speaker section 6, a display section 7, and a switch section 8, as shown in FIG. 1. The speaker section 6 includes a plurality of speakers 6a to 6c respectively provided on the sides of the rear of the upper case 2 in the array direction of the keys 5. The display section 7, which includes a flat-screen display panel such as a liquid crystal display panel or an electroluminescent (EL) display panel, is arranged in substantially the center of the upper case 2 and electro-optically displays various information required by the keyboard instrument.

The switch section 8 includes various switches required by the keyboard instrument, such as a power switch, a sound volume switch, a sound tone switch, and a function switch shown in FIG. 1, and a rotary switch device 10 shown in FIG. 2. This switch section 8 is provided such that the various switches are discretely arranged on the top surface of the upper case 2, as shown in FIG. 1.

In this instance, the rotary switch device 10 is provided in an end section 2a on one side (the left-hand side in FIG. 1) of the upper case 2 in the array direction of the keys 5, as shown in FIG. 1 and FIG. 2. This rotary switch device 10 is used to add an effect to musical sound during musical performance, by the user performing a switch operation thereon while performing key depression operations on the keys 5 in the keyboard section 4 for the musical performance. A first rotating operation unit 11 that adds a pitch-bend effect and a second rotating operation unit 12 that adds a modulation effect are included in this switch device 10, as shown in FIG. 1 and FIG. 2

Figure 13:
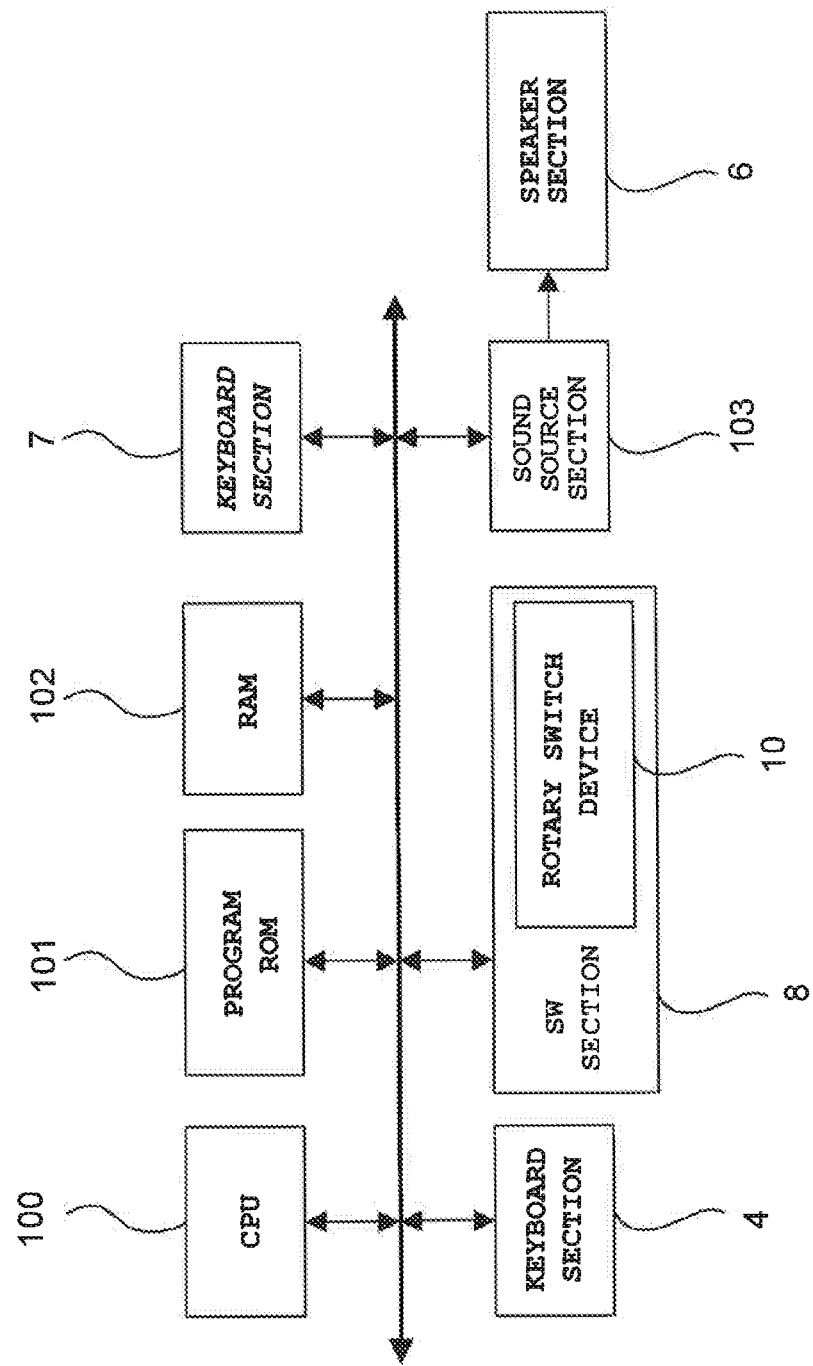
FIG. 13 is a block diagram of an embodiment in which the present invention has been applied to an electronic keyboard instrument.

A block diagram of the electronic keyboard instrument according to the present embodiment is shown in FIG. 13. This electronic keyboard instrument according to the present embodiment includes a Central Processing Unit (CPU) 100, a Read Only Memory (ROM) 101, a Random Access Memory (RAM) 102, the keyboard section 4, the display section 7, the switch section 8 including the rotary switch device 10, a sound source section 103, and the speaker section 6.

The CPU 100 performs various processing operations, such as the control of the entire electronic keyboard instrument, the detection of the operation of the switch section 8, the detection of key-depression and key-release operations on the keyboard section 4, and the generation of musical sound waveform data based on key-depression and key-release.

The ROM 101 stores processing programs for the control of the entire electronic keyboard device, the detection of the operation of the switch section 8, the detection of key-depression and key-release operations on the keyboard section 4, the generation of musical sound waveform data based on key-depression and key-release, etc. This ROM 101 has a preset waveform data area that stores preset waveform data for generating musical sound, such as piano sound or guitar sound.

The RAM 102 stores a program read out from the ROM 101 and data generated during processing.

The sound source section 103 reads out a predetermined preset waveform data from the preset waveform data area of the ROM 101, generates musical sound waveform data of a predetermined sound pitch, and outputs it to the speaker section 6, when a note ON event related to a depressed key 5 of the keyboard section 4 is received from the CPU 100.

The rotary switch device 10 adds, for example, a pitch-bend effect or a modulation effect to musical sound waveform data generated by the sound source section 103, based on the operation of the first rotating operation unit 11 and/or the operation of the second rotating operation unit 12.

In the present embodiment, the CPU 100, the ROM 101, the RAM 102, the sound source section 103, and the speaker section 6 constitute a musical sound generating section.

Figure 4:
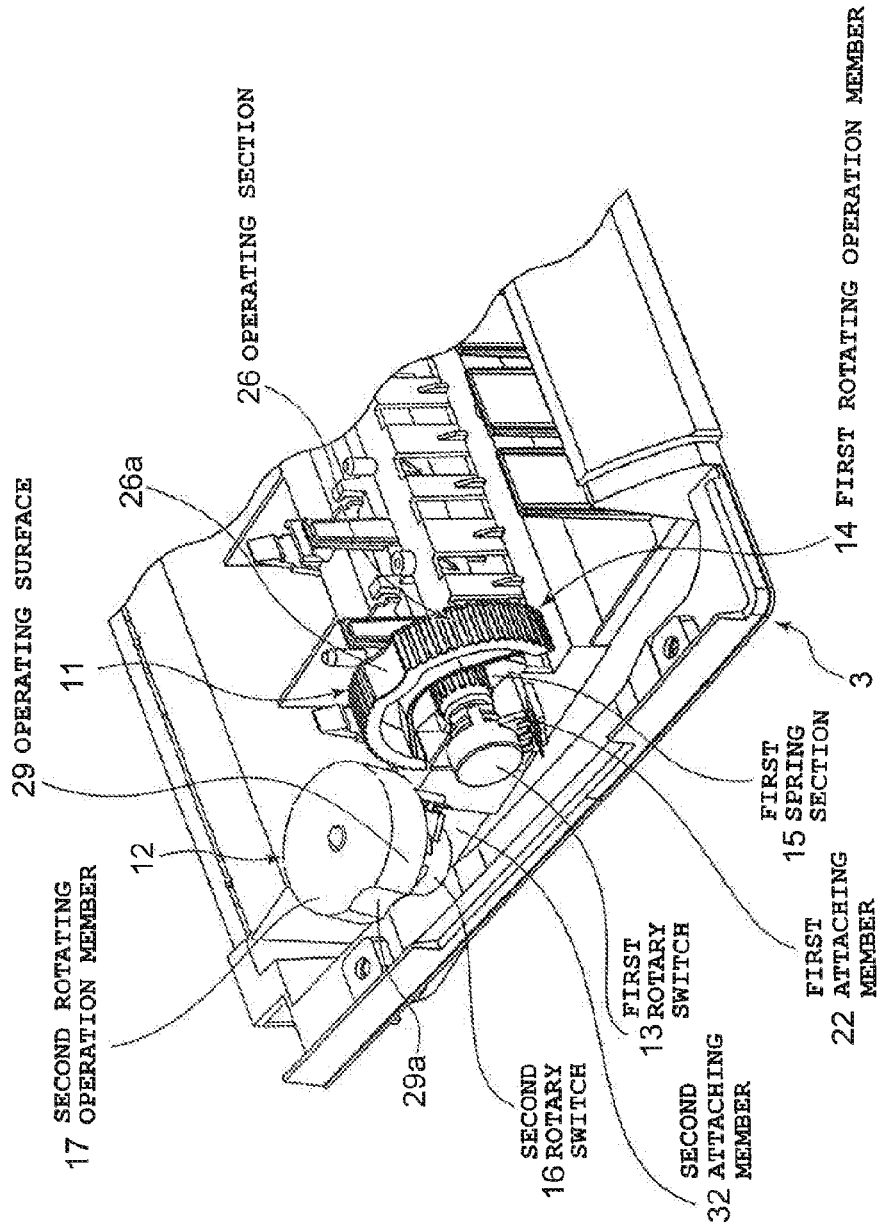
FIG. 4 is an enlarged perspective view showing the main section of a switch device arranged in the side portion of the upper case shown in FIG. 2.

The first rotating operation unit 11 is provided in the end section 2a on the left-hand side of the upper case 2, and a portion of its upper portion protrudes from the top surface of the end section 2a of the upper case 2, as shown in FIG. 2 and FIG. 4. This protruding portion is rotatable in a vertical direction (up and down direction). The second rotating operation unit 12 is provided in the end section 2a on the left-hand side of the upper case 2 to be in a position shifted towards the rear (the upper edge side in FIG. 1) of the first rotating operation unit 11, and a portion of its side portion is exposed from the side surface side (the left-hand side in FIG. 2) of the end section 2a of the upper case 2. This exposed portion is rotatable in a lateral direction (horizontal direction) parallel with the top surface of the upper case 2.

Figure 3:
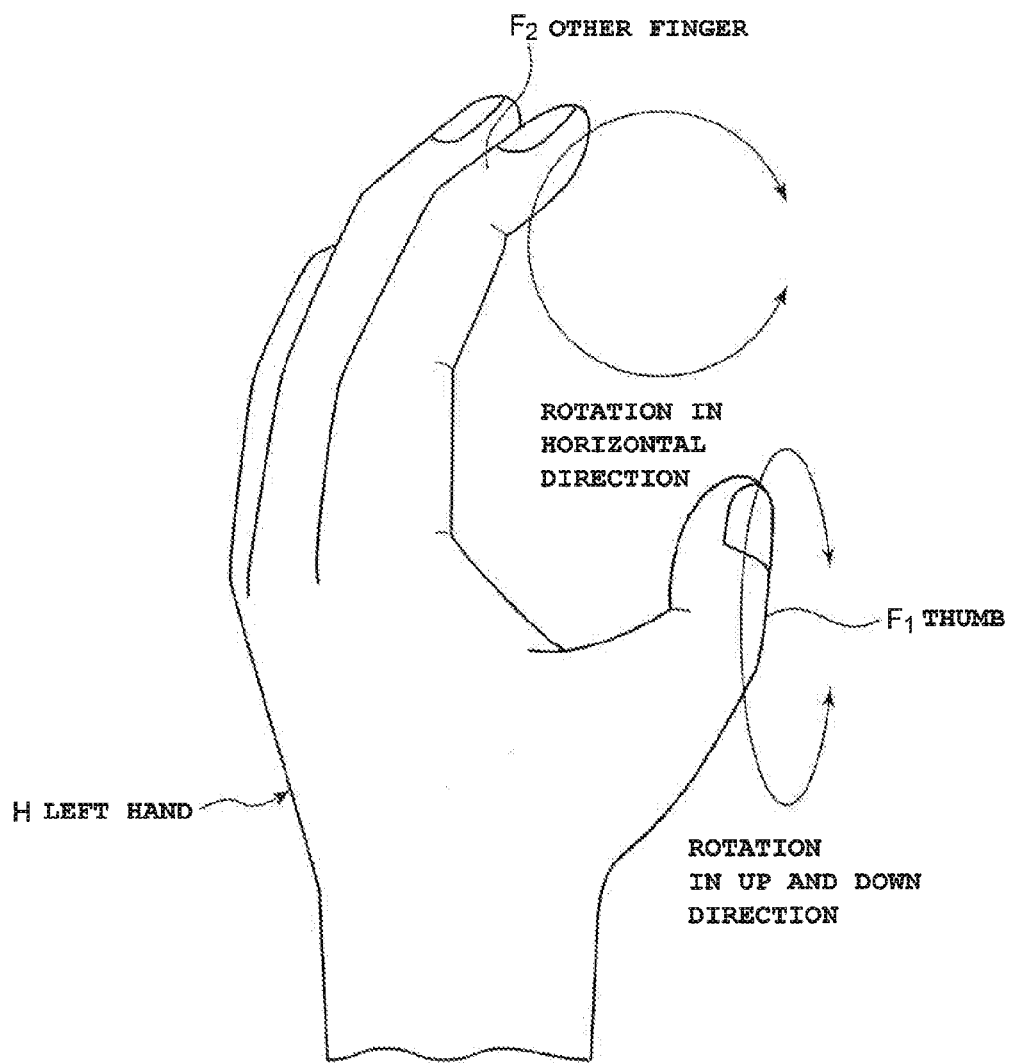
FIG. 3 is a diagram showing a left hand placed on the side portion of the upper case shown in FIG. 2, and the movement of each finger when the thumb of the left hand rotates a first rotating operation unit in an up and down direction and a finger other than the thumb rotates a second rotating operation unit in a horizontal direction.

In this instance, the first rotating operation unit 11 is switch-operated by the portion protruding from the top surface of the end section 2a of the upper case 2 being rotated in the vertical direction (up and down direction) by the thumb F1 of the left hand H of a player, as shown in FIG. 2 to FIG. 4. The second rotating operation unit 12 is switch-operated by the portion protruding from the side surface of the end section 2a of the upper case 2 being rotated in the lateral direction (horizontal direction) parallel with the top surface of the upper case 2 by a finger F2 (such as the index finger) of the player's left hand H other than the thumb F1.

The first rotating operation unit 11 includes a first rotary switch 13, a first rotating operation member 14, and a first spring member 15, as shown in FIG. 4 to FIG. 7. Similarly, the second rotating operation unit 12 includes a second rotary switch 16, a second rotating operation member 17 and a second spring member (not shown). The first rotating operation unit 11 and the second rotating operation unit 12 are structured to be substantially the same except for their rotation directions.

Figure 6A:
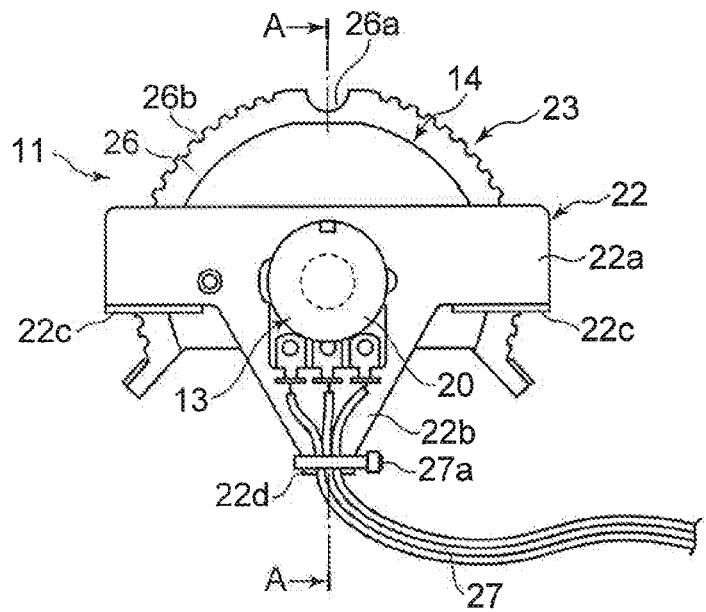

Here, the first rotating operation unit 11 will first be described. The first rotary switch 13 of this first rotating operation unit 11 includes a switch main body 20 and a switch shaft 21 rotatably attached to the switch main body 20, as shown in FIG. 6A to FIG. 7. The switch main body 20 electrically detects a change in the rotation movement of the switch shaft 21 and outputs a detection signal.

Figure 5:
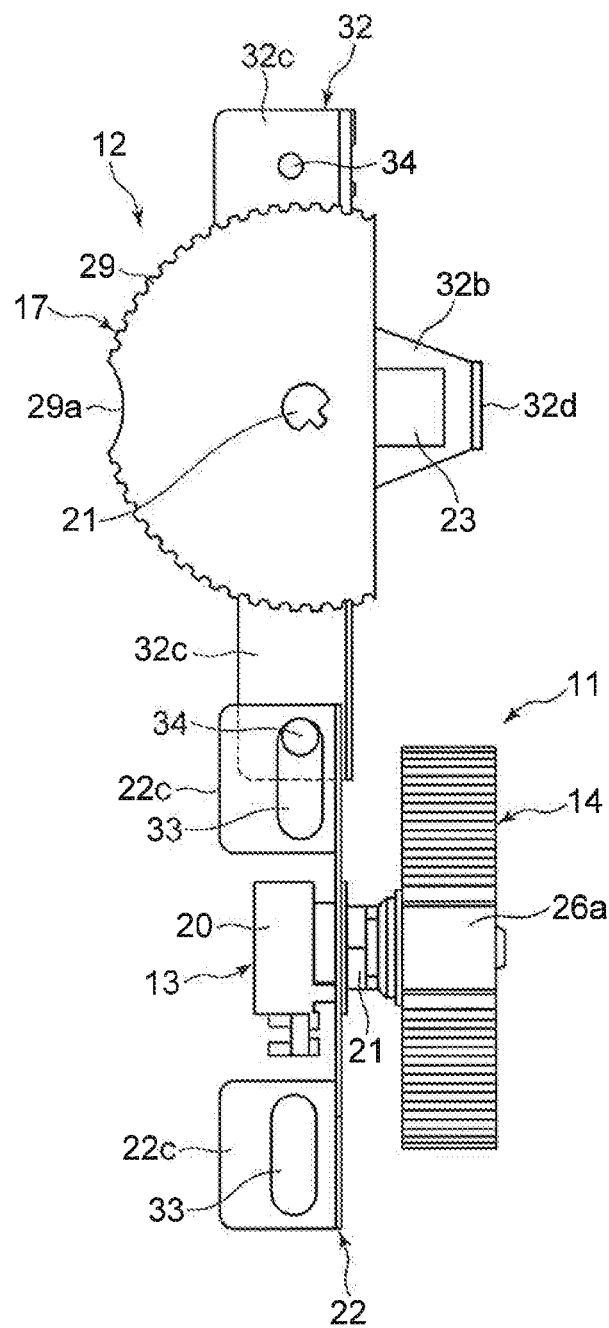
FIG. 5 is an enlarged planar view showing the switch device of FIG. 4 when viewed from above.

The first rotary switch 13 is structured such that the switch main body 20 is attached to a first attaching member 22 as shown in FIG. 5 to FIG. 7, and is attached above the lower case 3 within the end section 2a on the left-hand side of the upper case 2 by the first attaching member 22. In addition, the first rotary switch 13 is structured such that the first rotating operation member 14 is attached to its switch shaft 21, as shown in FIG. 7.

As a result, the first rotating operation member 14 is attached to the upper case 2 by the first attaching member 22, together with the first rotary switch 13, as shown in FIG. 5 to FIG. 7. In this state, the first rotating operation member 14 rotates around the switch shaft 21 of the first rotary switch 13, together with the switch shaft 21.

Figure 6B:
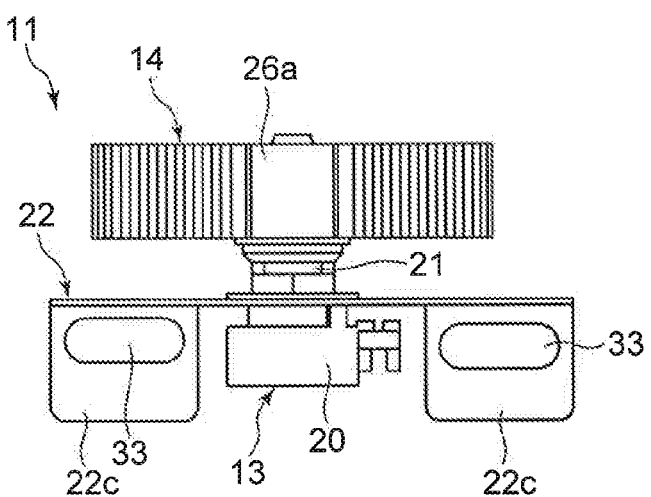
Figure 7:
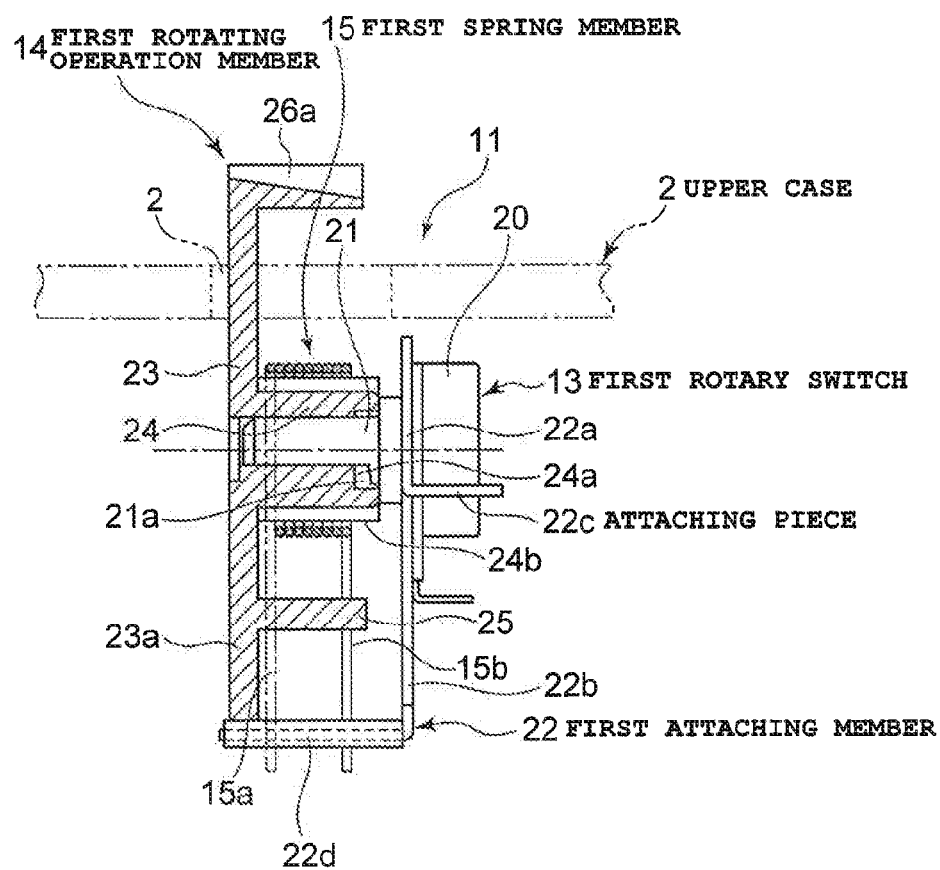
FIG. 7 is an enlarged cross-sectional view showing the first rotating operation unit taken along line A-A in FIG. 6A.

The first attaching member 22 is used to attach the first rotary switch 13 above the lower case 3 within the end section 2a on the left-hand side of the upper case 2, as shown in FIG. 5 to FIG. 6B. This first attaching member 22 includes a switch attaching section 22a to which the switch main body 20 of the first rotary switch 13 is attached, an extending section 22b that extends downward from the switch attaching section 22a, and an attaching piece 22c that is attached to the lower case 3 of the instrument main body 1, which are integrally formed by a metal plate.

In this instance, a shaft insertion hole (not shown) into which the switch shaft 21 of the first rotary switch 13 is inserted is provided in an intermediate portion of the switch attaching section 22a. In addition, a spring fixing section 22d that protrudes toward the first rotating operation member 14 side (the left-hand side in FIG. 7) is provided on the lower end portion of the extending section 22b, as shown in FIG. 6A to FIG. 8.

The first rotating operation member 14 includes a substantially semicircular operating main body section 23 that is partially exposed upward from a rectangular opening section 2b provided on the top surface of the end section 2a of the upper case 2, a circular cylinder section 24 that is provided in the rotational center of the operating main body section 23 and to which the switch shaft 21 of the first rotary switch 13 is attached, and a spring operating section 25 that is provided in the operating main body section 23 and presses the first spring member 15, as shown in FIG. 2, and FIG. 4 to FIG. 7. These sections are integrally formed using synthetic resin.

In this instance, the substantially upper half of the operating main body section 23 protrudes upward from the opening section 2b provided on the top surface of the end section 2a of the upper case 2, as shown in FIG. 2, and FIG. 4 to FIG. 7. In this state, the operating main body section 23 is rotated in the up and down direction centered on the circular cylinder section 24 to which the switch shaft 21 of the first rotary switch 13 is attached.

The circular cylinder section 24 is provided in the rotational center of the operating main body section 23, and the switch shaft 21 of the first rotary switch 13 is inserted into and attached to this circular cylinder section 24, as shown in FIG. 7. In addition, the first spring member 15 is attached to the outer peripheral surface of this circular cylinder section 24. In this instance, a key section 24a is provided within the circular cylinder section 24 along the axial direction, as shown in FIG. 7 and FIG. 8.

Accordingly, as shown in FIG. 7, a notched section 21a corresponding to the key section 24a is provided in the outer peripheral surface of the switch shaft 21 in the first rotary switch 13, along the axial direction. As a result, in a state where the notched section 21a corresponds to the key section 24a within the circular cylinder section 24, the switch shaft 21 of the first rotary switch 13 is inserted and fitted into the circular cylinder section 24 as shown in FIG. 7 and FIG. 8, and thereby rotates integrally with the first rotating operation member 14.

Figure 8:
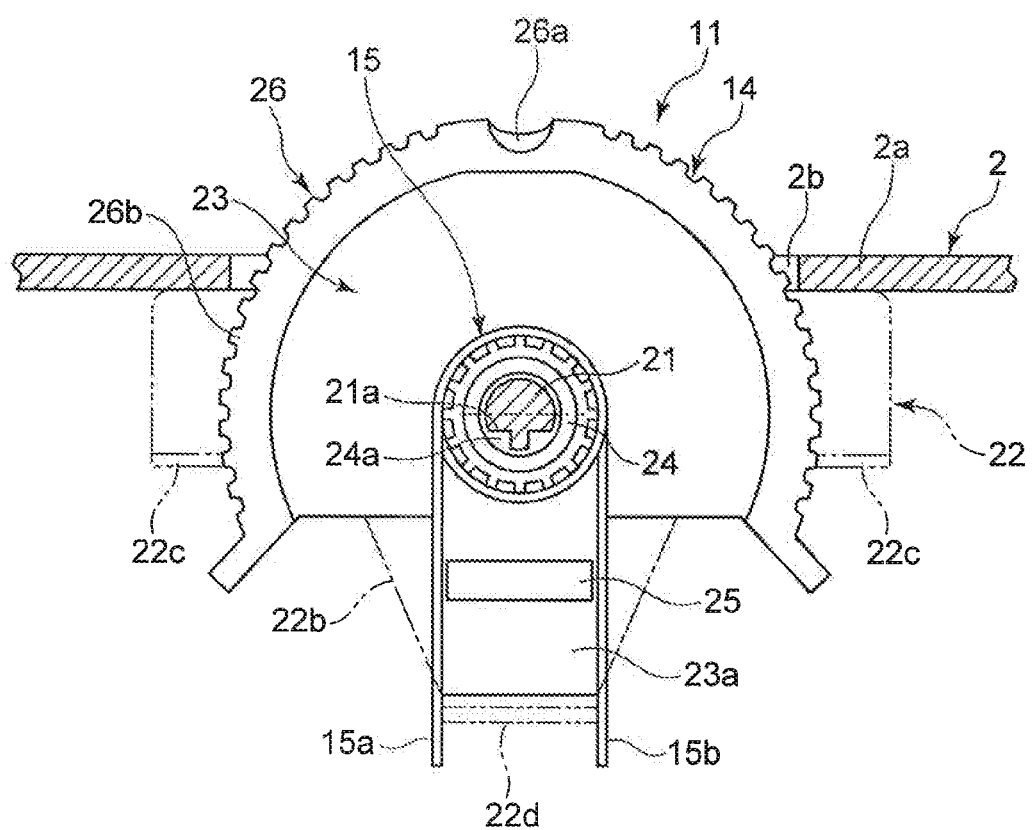
FIG. 8 is an enlarged front view showing the first rotating operation member of the switch device in FIG. 6A in a neutral state.

Also, on the outer peripheral surface of the circular cylinder section 24 of the first rotating operation member 14, numerous projecting sections 24b for reducing frictional resistance against the first spring member 15 described hereafter are provided as shown in FIG. 7 and FIG. 8. This outer peripheral portion of the first rotating operation member 14 is formed into an outer peripheral wall section as shown in FIG. 7, which is provided to project towards the same direction (the rightward direction in FIG. 7) as that of the circular cylinder section 24 in the axial direction, from the outer peripheral portion of the operating main body section 23. On the outer peripheral surface of this outer peripheral wall section, an operating surface 26 is formed.

This operating surface 26 is formed such that its projecting length in the axial direction of the first rotating operation member 14 is substantially the same as the length of the circular cylinder section 24, as shown in FIG. 7. In the uppermost portion of the outer peripheral surface where the operating surface 26 is formed, a first groove section 26a is obliquely formed in a manner to gradually deepen towards the base (the right-hand side in FIG. 7) of the thumb F1, as shown in FIG. 7 and FIG. 8. This first groove section 26a restricts the position of the fingertip of the thumb F1 when the first rotating operation member 14 is rotated by the fingertip. Also, on the operating surface 26, a slide-proofing recess and projection section 26b for preventing the fingertip from sliding is provided.

On the operating main body section 23 of the first rotating operation member 14, an extending section 23a is formed to extend downward, and the spring operating section 25 is provided on the extending section 23a to project in the same direction as that of the circular cylinder section 24 in the axial direction, as shown in FIG. 7 and FIG. 8. The spring operating section 25 is a rectangular plate whose length (width) in the rotation direction of the first rotating operation member 14 is substantially the same as or slightly shorter than the length of the spring fixing section 22d of the first attaching member 22 in the direction corresponding to the rotation direction.

The first spring member 15 is a coil-shaped torsion spring that is wound around the outer peripheral surface of the first rotating operation member 14 in a manner to be displaceable (stretchable) in the radial direction, as shown in FIG. 7 and FIG. 8. End portions 15a and 15b of this first spring member 15 respectively pass through the sides of the spring operating section 25 of the first rotating operation member 14, and are arranged on the sides of the spring fixing section 22d provided on the extending section 22b of the first attaching member 22.

In this instance, the spring fixing section 22d of the first attaching member 22 extends substantially horizontally from the lower end portion of the extending section 22b of the first attaching member 22 toward the lower end portion side of the first rotating operation member 14, and the extending tip portion (the left end portion in FIG. 7) is positioned below the spring operating section 25, as shown in FIG. 7.

As a result, the spring fixing section 22d of the first attaching member 22 is positioned below the spring operating section 25 of the first rotating operation member 14, as shown in FIG. 7 and FIG. 8. In this state, the end portions 15a and 15b of the first spring member 15 are respectively arranged on the sides of the spring fixing section 22d, whereby the spring fixing section 22d is resiliently interposed between the end portions 15a and 15b of the first spring member 15.

Figure 9:
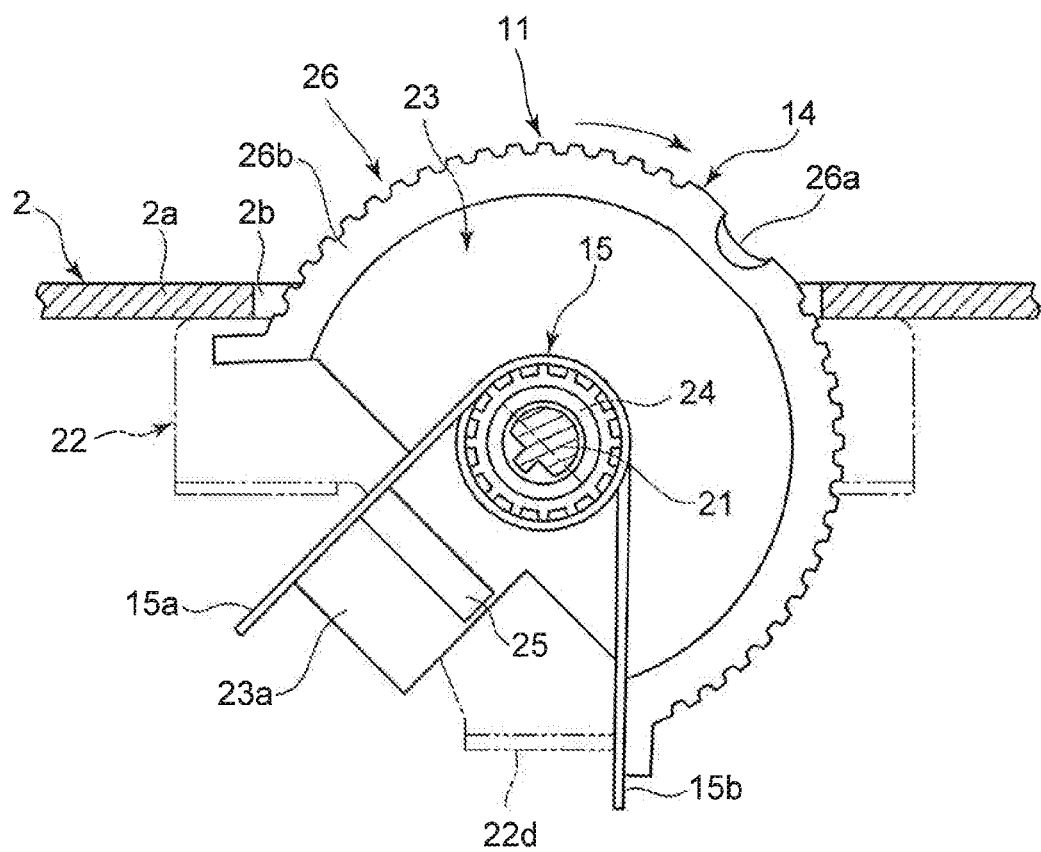
FIG. 9 is an enlarged front view showing the first rotating operation member of FIG. 8 when it has been rotated in a forward direction (clockwise direction)

This first spring member 15 applies load onto the first rotating operation member 14, as shown in FIG. 8 and FIG. 9. When the first rotating operation member 14 rotates in a forward direction (the clockwise direction in FIG. 9) or a reverse direction (the counter-clockwise direction in FIG. 9), one of the end portions 15a and 15b of the first spring member 15 is pushed outward by the end portion of the spring operating section 25 on the rotation direction side. As a result, the load applied to the first rotating operation member 14 is gradually increased along with the rotation of the first rotating operation member 14.

Also, when the first rotating operation member 14 is in a neutral state where it has not been rotated in either direction, the first spring member 15 applies minimal load onto the first rotating operation member 14, as shown in FIG. 8. As a result, when rotating from the neutral state, the first rotating operation member 14 starts rotating with little force, and gradually requires greater force as it rotates.

In this instance, when the first rotating operation member 14 is in the neutral state where it has not been rotated in either direction, the intermediate portion of the operating surface 26 of the first rotating operation member 14 is positioned at the intermediate portion of the opening section 2b in the end section 2a of the upper case 2, as shown in FIG. 8. In this neutral state, the upper half portions of the operating surface 26 and the operating main body section 23 protrude from the end section 2a of the upper case 2.

In addition, when the first rotating operation member 14 is in the neutral state where it has not been rotated in either direction, the first groove section 26a provided on the operating surface 26 of the first rotating operation member 14 is also positioned at the intermediate portion of the opening section 2b in the end section 2a of the upper case 2, as shown in FIG. 8. When the first rotating operation member 14 is operated with the thumb F1 of the left hand H placed on the first groove section 26a, the operating surface 26 and the operating main body section 23 rotates in either the forward direction (the clockwise direction in FIG. 9) or the reverse direction (the counter-clockwise direction in FIG. 9) against the spring force of the first spring member 15.

The first rotary switch 13 is electrically connected by a connection cable 27 to a circuit board (not shown) provided in the instrument main body 1, as shown in FIG. 6A. In this instance, the connection cable 27 is fixed onto the first attaching member 22 by a fixture 27a with one end connected to the switch main body 20. In this state, the other end is led within the instrument case 1 and is connected to the circuit board.

The second rotating operation unit 12 includes a second rotary switch 16, a second rotating operation member 17 and a second spring member (not shown), as shown in FIG. 4 and FIG. 10. The second rotary switch 16, the second rotating operation member 17 and the second spring member are to rotate in a lateral direction (horizontal direction) parallel with the top surface of the upper case 2, and have substantially the same structures as the first rotary switch 13, the first rotating operation member 14 and the first spring member 15 of the first rotating operation unit 11, except for this aspect.

Figure 10A:
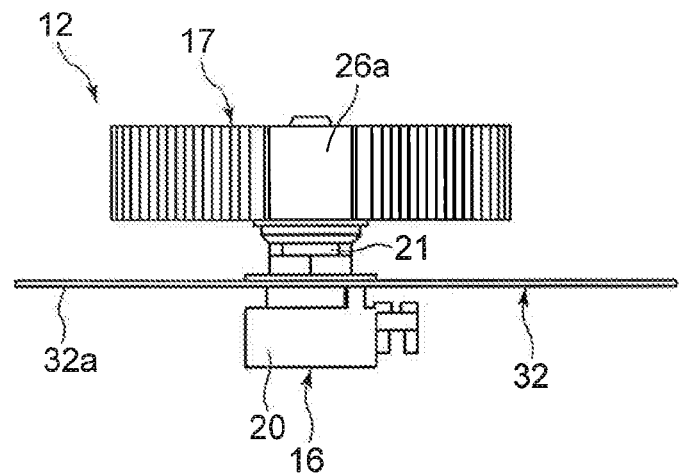
Figure 10B:
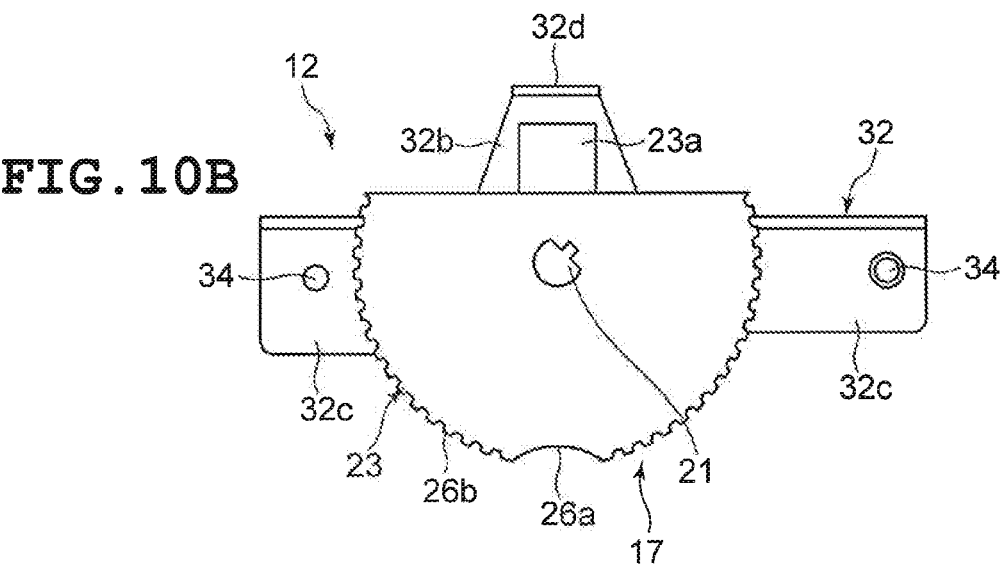

That is, the second rotary switch 16 has the same structure as the first rotary switch 13, in which the switch main body 20 electrically detects a change in the rotational movement of the switch shaft 21, and outputs a detection signal. The switch main body 20 of the second rotary switch 16 is attached to a second attaching member 32, and the second rotary switch 16 is attached above a portion of the lower case 3 within the end section 2a on the left-hand side of the upper case 2 by the second attaching member 32, as shown in FIG. 10A and FIG. 10B.

In addition, the second rotary switch 16 is structured such that the second rotating operation member 17 is attached to its switch shaft 21. As a result, the second rotating operation member 17 is attached to the upper case 2 by the second attaching member 32, together with the second rotary switch 16, as shown in FIG. 10A and FIG. 10B. In this state, the second rotating operation member 17 rotates around the switch shaft 21 of the second rotary switch 16 together with the switch shaft 21.

The second attaching member 32 is used to attach the second rotary switch 16 above the lower case 3 within the end section 2a on the left-hand side of the upper case 2, as shown in FIG. 4 and FIG. 5. This second attaching member 32 includes a switch attaching section 32a to which the switch main body 20 of the second rotary switch 16 is attached, an extending section 32b that extends downward from the switch attaching section 32a, and an attaching piece 32c that is attached to the lower case 3 of the instrument main body 1, which are integrally formed by a metal plate, as shown in FIG. 10A and FIG. 10B.

As shown in FIG. 5, the second attaching member 32 is attached on the same plane of the lower case 3 on which the first attaching member 22 is attached, such that it is placed at a position shifted in the front and back direction. In this instance, an adjustment hole 33 that is an elongated hole for adjusting the space between the first rotating operation member 14 and the second rotating operation member 17 is formed in the attaching piece 22c of the first attaching member 22. In addition, an attachment hole 34 is provided in the attaching piece 32c of the second attaching member 32, where a screw (not shown) is inserted.

As a result, the first attaching member 22 and the second attaching member 32 are structured such that the attaching piece 22c (the upper side in FIG. 5) of the first attaching member 22 and the attaching piece 32c (the lower side in FIG. 5) of the second attaching member 32 are overlapped with each other, and attached above the lower case 3 by the adjustment hole 33 provided in the attaching piece 22c and the attachment hole 34 provided in the attaching piece 32c being placed to correspond to each other and a screw is inserted thereinto, as shown in FIG. 5.

Figure 11:
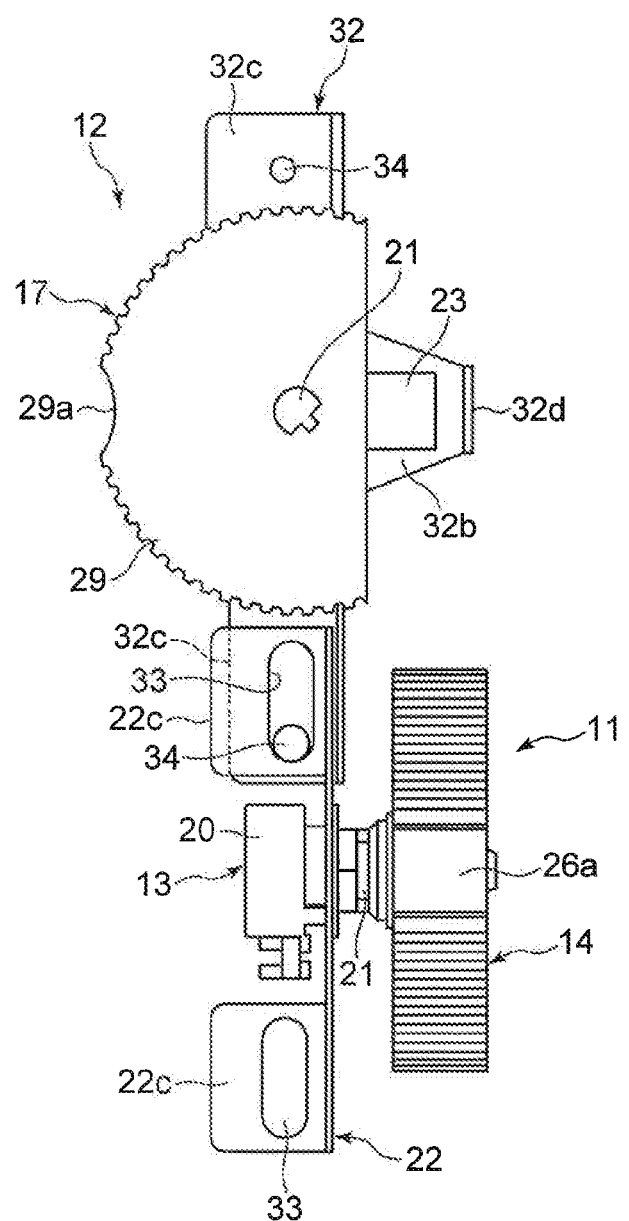
FIG. 11 is an enlarged planar view showing the switch device of FIG. 5 whose space between the first rotating operation member and a second rotating operation member has been narrowed.

In addition, the first attaching member 22 and the second attaching member 32 are structured such that, when the screw inserted into the adjustment hole 33 of the attaching piece 22c of the first attaching member 22 is loosened and the first attaching member 22 is moved by being slid along the adjustment hole 33, the attachment position of the first attachment member 22 in relation to the lower case 3 is changed, whereby the space between the first rotating operation member 14 and the second rotating operation member 17 is changed, as shown in FIG. 11.

In an intermediate portion of the switch attaching section 32a of the second attaching member 32, a shaft insertion hole (not shown) is provided into which the switch shaft 21 of the second rotary switch 16 is inserted. Also, on the lower end portion of the extending section 32b, a spring fixing section 32d that projects towards the second rotating operation member 17 side, or in other words, towards the top surface of the upper case 2 is provided, as shown in FIG. 10A and FIG. 10B.

The second rotating operation member 17 has substantially the same structure as the first rotating operation member 14, in which the operating main body section 23 is arranged to be rotatable in the horizontal direction, as shown in FIG. 4. The second spring member (not shown) has the same structure as the first spring member 15, and this second spring member and its end portions are arranged in the horizontal direction.

In this instance, a notched section 28 is provided in the end section 2a on the left-hand side of the upper case 2 in a manner to be open toward the top surface and the side surface of the end section 2a, as shown in FIG. 1 and FIG. 2. In addition, a rectangular opening section 28a into which a left side portion of the operating main body section 23 of the second rotating operation member 17 is inserted is provided in a vertical surface of the notched section 28, as shown in FIG. 2. As a result, a left side portion of the operating main body section 23 of the second rotating operation member 17 protrudes into the notched section 28 from the opening section 28a, and is exposed on the outside of the upper case 2.

In addition, as in the case of the operating main body section 23 of the first rotating operation unit 11, the outer peripheral portion of the operating main body section 23 of the second rotating operation member 17 is formed into an outer peripheral wall section, which is provided to project towards the same direction as that of the circular cylinder section in the axial direction from the outer peripheral portion of the operating main body section 23 of the second rotating operation member 17. On the outer peripheral surface of this outer peripheral wall section, an operating surface 29 is formed, which is identical to that of the operating surface 26 of the first rotating operation unit 11.

This operating surface 29 is formed such that its projecting length in the axial direction of the second rotating operation member 17 is substantially the same as the length of the circular cylinder section, as shown in FIG. 2. In the outermost portion of the outer peripheral surface where the operating surface 29 is formed, a second groove section 29a is obliquely formed in a manner to gradually deepen from the lower side to the upper side, as shown in FIG. 2 and FIG. 3. This second groove section 29a restricts the position of a fingertip when the second rotating operation member 17 is rotated by the fingertip of a finger F2 other than the thumb F1 (such as the index finger).

In the end section 2a on the left-hand side of the upper case 2, a position restricting recess section 30 is provided which restricts the position of a portion of the left hand H, such as a portion of the palm of the left hand H, as shown in FIG. 1 and FIG. 2. This position restricting recess section 30 is formed into a recess groove curved into an arc shape from the lower side to the upper side, in an upper edge portion of the end section 2a of the upper case 2. As a result, when a portion of the left hand H is placed on the position restricting recess section 30, the thumb F1 naturally corresponds to the first rotating operation unit 11, and the other finger F2 corresponds to the second rotating operation unit 12.

In the notched section 28 provided in the end section 2a on the left-hand side of the upper case 2, a scale marking section 31 for indicating an operating position is formed along the operating surface 29 of the second rotating operation member 17 protruding from within the notched section 28, as shown in FIG. 2. This scale marking section 31 is a plurality of recesses provided at a predetermined interval, which is formed in a portion of the bottom of the notched section 28 located on the outer peripheral side of the operating surface 29 of the second rotating operation member 17 along the operating surface 29 of the second rotating operation member 17.

Next, the mounting of the rotary switch device 10 to the instrument main body 1 will be described. Firstly, the first rotating operation unit 11 will be described.

First, the first spring member 15 is attached to the first rotating operation member 14 of the first rotating operation unit 11. In this step, the circular cylinder section 24 provided in the rotational center of the first rotating operation unit 11 is correspondingly inserted into the twisted portion of the first spring member 15, and the end portions 15a and 15b of the first spring member 15 are arranged on the sides of the spring operating section 25 of the first rotating operation member 14, respectively.

In this state, the first rotating operation member 14 is attached to the first rotary switch 13. In this step, the switch shaft 21 of the first rotary switch 13 is inserted into the shaft insertion hole 22c of the first attaching member 22 in advance, and then the switch main body 20 of the first rotary switch 13 is attached to the first attaching member 22. In addition, one end of the connection cable 27 is connected to the switch main body 20 and fixed to the first attaching member 22 by the fixture 27a.

Then, the switch shaft 21 rotatably attached to the switch main body 20 is inserted into the circular cylinder section 24 provided in the rotational center of the first rotating operation member 14. In this step, the switch shaft 21 is inserted into the circular cylinder section 24 with the notched section 21a thereof corresponding to the key section 24c provided within the circular cylinder section 24.

As a result, the first rotating operation member 14 is attached to the switch shaft 21 of the first rotary switch 13 such that the switch shaft 21 rotates with the rotation of the first rotating operation member 14. In addition, when the switch shaft 21 is inserted into the circular cylinder section 24, the spring fixing section 22d provided on the extending section 22b of the first attaching member 22 is inserted and arranged between the end portions 15a and 15b of the first spring member 15.

Next, the second rotating operation unit 12 is mounted to the instrument main body 1 similar to that of the first rotating operation unit 11. First, the second spring member (not shown) is attached to the second rotating operation member 17, and the second rotating operation member 17 is attached to the second rotary switch 16, as in the case of the first rotating operation unit 11. In this state, the switch main body 21 of the second rotary switch 16 is attached to the second attaching member 32, and one end of another connection cable 27 is connected to the switch main body 21 and fixed to the second attaching member 32 by a fixture, as in the case of the first rotating operation unit 11.

Then, the first attaching member 22 is arranged upright (vertical state) on a portion of the lower case 3 within the end section 2a on the left-hand side of the upper case 2 of the instrument main body 1, and the second attaching member 32 is laterally arranged (horizontal state) on a portion of the lower case 3 within the end section 2a on the left-hand side of the upper case 2 of the instrument main body 1 in a manner to be parallel with the top surface of the upper case 2.

In this step, the upper side of the first rotating operation member 14 is inserted into the opening section 2b provided in the end section 2a of the upper case 2 from within the end section 2a of the upper case 2, and thereby protrudes from the top surface of the end section 2a. In addition, the outer peripheral portion of the second rotating operation member 17 is inserted into the opening section 28a of the notched section 28 provided in the end section 2a of the upper case 2 from within the end section 2a of the upper case 1, and thereby protrudes from the notched section 28.

In this state, the attaching piece 22c of the first attaching member 22 and the attaching piece 32c of the second attaching member 32, by which the first attaching member 22 and the second attaching member 32 come close to each other, are overlapped such that the adjustment hole 33 provided in the attaching piece 22c and the attachment hole 34 provided in the attaching piece 32c correspond to each other, as shown in FIG. 5. Then, a screw is inserted into the adjustment hole 33 and the attachment hole 34, and fastened. As a result, the attaching piece 22c of the first attaching member 22 and the attaching piece 32c of the second attaching member 32 are attached on the same plane above the lower case 3.

In this instance, in the adjustment of the attachment positions of the first attaching member 22 and the second attaching member 32, the screw inserted into the adjustment hole 33 in the attaching piece 22c of the first attaching member 22 is loosened, and the first attaching member 22 is moved by being slid along the adjustment hole 33 in a direction approaching or moving away from the second attaching member 32, as shown in FIG. 11. As a result, the attachment position of the first attaching member 22 in relation to the lower case 3 is changed, and the space between the first rotating operation member 14 and the second rotating operation member 17 is changed.

Then, one end of each connection cable 27 is connected and fixed to each of the first rotary switch 13 and the second rotary switch 16 that electrically connect to the circuit board (not shown) provided with the other end of each connection cable 27 in the instrument main body 1. Accordingly, the first rotating operation unit 11 and the second rotating operation unit 12 are mounted to the instrument main body 1.

Next, the mechanism of the electronic keyboard instrument when it is played will be described.

In musical performance by the electronic keyboard instrument, key-depression operations are performed on the plurality of keys 5 of the keyboard section 4 exposed upward from the upper case 2 of the instrument main body 1. As a result, musical sounds based on the musical performance are emitted from the speaker section 6. During this musical performance, when the first rotating operation unit 11 and the second rotating operation unit 12 in the rotary switch device 10 are respectively rotated, effects based on the rotations of the first rotating operation unit 11 and the second rotating operation unit 12 are added to the emitted musical sounds.

Specifically, when a portion of the left hand H of the instrument player is placed on the position restricting recess section 30 provided in the upper edge portion of the end section 2a on the left-hand side of the upper case 2, the position restricting recess section 30 restricts the position of the left hand H in relation to the end section 2a of the upper case 2. As a result, the thumb F1 of the left hand H corresponds to a portion of the first rotating operation unit 11 which is protruding upward from the end section 2a of the upper case 2, and a finger F2 of the left hand H other than the thumb F1 (such as the index finger) corresponds to a portion of the second rotating operation unit 12 which is protruding from the notched section 28 in the end section 2a of the upper case 2.

In this state, when the first rotating operation member 14 of the first rotating operation unit 11 is rotated by the thumb F1, a pitch-bend effect that changes the pitch (low and high) of a sound can be added to the musical sound, based on the rotation of the first rotating operation member 14. In addition, when the second rotating operation member 17 of the second rotating operation unit 12 is rotated by a finger F2 other than the thumb F1, a modulation effect that vibrates a sound, such as vibrato, can be added to the musical sound, based on the rotation of the second rotating operation member 17.

In this instance, when the left hand H is placed on the upper edge portion of the end section 2a on the left-hand side of the upper case 2, and a portion of the left hand H is placed on the position restricting recess section 30 provided in the upper edge portion of the end section 2a of the upper case 2, the position of the left hand H can be precisely and unfailingly restricted to a predetermined position in the end section 2a of the upper case 2. As a result, the position of the thumb F1 of the left hand H can be restricted corresponding to the operating surface 26 of the first rotating operation unit 11, and the position of a finger F2 of the left hand H other than the thumb F1 can be restricted corresponding to the operating surface 29 of the second rotating operation unit 12.

In this state, the first rotating operation unit 11 and the second rotating operation unit 12 can be separately rotated by the fingers F1 and F2 of the left hand H. For example, when the first rotating operation member 14 of the first rotating operation unit 11 is rotated in the forward direction (clockwise direction) by the thumb F1 of the left hand H, the spring operating section 25 is moved along with it, and rotated in the same direction against the spring force of the first spring member 15.

When the spring operating section 25 is moved and rotated, one end portion 15b of the first spring member 15 comes in contact with the spring fixing section 22d of the first attaching member 22 to be held thereby, and the other end portion 15a of the first spring member 15 is pushed outward by the spring operating section 25, as shown in FIG. 9. As a result of this structure, when the first rotating operation member 14 is rotated, the spring force of the first spring member 15 is applied to the fingertip of the thumb F1 as load.

Then, when the fingertip of the thumb F1 is removed from the operating surface 26 of the first rotating operation member 14, the spring operating section 25 of the first rotating operation member 14 is pressed back in the counter-clockwise direction by the end portion 15a of the first spring member 15. Accordingly, the first rotating operation member 14 returns to the neutral state (neutral position) by the spring force of the first spring member 15, as shown in FIG. 8.

Also, when the first rotating operation member 14 is rotated in the reverse direction (counter-clockwise direction), one end portion 15a of the first spring member 15 comes in contact with the spring fixing section 22d of the first attaching member 22 to be held thereby, and the other end portion 15b of the first spring member 15 is pushed outward by the spring operating section 25. As a result of this structure, when the first rotating operation member 14 is rotated, the spring force of the first spring member 15 is applied to the fingertip of the thumb F1 as load. Then, when the fingertip of the thumb F1 is removed from the operating surface 26 of the first rotating operation member 14, the first rotating operation member 14 returns to the neutral state (neutral position) by the spring force of the first spring member 15.

Similarly, when the second rotating operation member 17 of the second rotating operation unit 12 is rotated in the forward direction (clockwise direction) by a finger F2 of the left hand H other than the thumb F1, such as the index finger, the spring operating section is moved along with it and rotated in the same direction against the spring force of the second spring member. When the spring operating section is moved and rotated, one end portion of the second spring member (equivalent to one end portion 15a of the first spring member 15) comes in contact with the spring fixing section of the attaching member to be held thereby, and the other end portion of the second spring member (equivalent to the other end portion 15b of the first spring member 15) is pushed outward by the spring operating member, as in the case of the first rotation operation unit 11.

As a result of this structure, when the second rotating operation member 17 is rotated, the spring force of the second spring member is applied to the fingertip of a finger F2 other than the thumb F1 as load. Then, when the fingertip of a finger F2 other than the thumb F1 is removed from the operating surface 29 of the second rotating operation member 17, the spring operating section of the second rotating operation member 17 is pressed back in the counter-clockwise direction by the other end portion of the second spring member, and accordingly the second rotating operation member 17 returns to the neutral state (neutral position) by the spring force of the second spring member, as shown in FIG. 8.

Also, when the second rotating operation member 17 is rotated in the reverse direction (counter-clockwise direction), one end portion of the second spring member comes in contact with the spring fixing section of the attaching member to be held thereby, and the other end portion of the second spring member is pushed outward by the spring operating section, as in the case of the first rotating operation unit 11. As a result of this structure, when the second rotating operation member 17 is rotated, the spring force of the second spring member is applied to the fingertip of a finger F2 other than the thumb F1 as load. Then, when the fingertip of a finger F2 other than the thumb F1 is removed from the operating surface 29 of the second rotating operation member 17, the second rotating operation member 17 returns to the neutral state (neutral position) by the spring force of the second spring member.

As described above, the switch device 10 of the keyboard instrument includes the first rotating operation unit 11 which is arranged in one end section 2a of the instrument main body 1 and a portion of which protrudes from the top surface of the instrument main body 1, and the second rotating operation unit 12 which is arranged in one end section 2a of the instrument main body 1 to be positioned posterior to the first rotating operation unit 11 and a portion of which is exposed on the side surface side of the one end section 2a. The first rotating operation unit 11 is switch-operated by the protruding portion being rotated in the up and down direction by the thumb F1 of the left hand H, and the second rotating operation unit 12 is switch-operated by the exposed portion being rotated in the horizontal direction by a finger F2 of the left hand H other than the thumb F1. Therefore, two switch operations can be simultaneously performed with one hand.

That is, in the switch device 10, the first rotating operation unit 11 and the second rotating operation unit 12 can be arranged in one end section 2a of the upper case 2 of the instrument main body 1 based on ergonomics. Therefore, when the left hand H is placed on the end section 2a on the left-hand side of the upper case 2 of the instrument main body 1, the thumb F1 of the left hand H is placed corresponding to a portion of the first rotating operation unit 11 protruding from the top surface of the end section 2a of the upper case 2 of the instrument main body 1, and a finger F2 other than the thumb F1 is placed corresponding to a portion of the second rotating operation unit 12 exposed on the side surface side of the end section 2a of the upper case 2 of the instrument main body 1.

Therefore, the first rotating operation unit 11 and the second rotating operation unit 12 can be separately rotated by only the left hand H, whereby two switch operations can be simultaneously performed with one hand. In these operations, the pitch-bend effect that changes pitch can be added to musical sound by the rotation of the first rotating operation unit 11, and the modulation effect that vibrates sound, such as vibrato, can be added to musical sound by the rotation of the second rotating operation unit 12.

In this instance, the first rotating operation unit 11 includes the first rotary switch section 13 that is attached in a manner to be rotatable in the up and down direction in relation to the instrument main body 1, the first rotating operation member 14 that switch-operates the first switch section 13 in response to a rotating operation in the up and down direction (vertical direction), and the first spring member 15 that applies load to the first rotating operation member 14 when the first rotating operation member 14 is rotated. Therefore, when the first rotating operation member 14 is rotated by the thumb F1 of the left hand H, load is applied to the thumb F1 by the spring force of the first spring member 15, whereby the first rotating operation member 14 can be favorably rotated to add an effect, such as pitch-bending, to musical sound.

In addition, the second rotating operation unit 12 includes the rotary second switch section 16 that is attached in a manner to be rotatable in the horizontal direction in relation to the instrument main body 1, the second rotating operation member 17 that switch-operates the second switch section 16 in response to a rotating operation in the horizontal direction (lateral direction), and the second spring member (not shown) that applies load to the second rotating operation member 17 when the second rotating operation member 17 is rotated. Therefore, when the second rotating operation member 17 is rotated by a finger F2 of the left hand H other than the thumb F1, load is applied to a finger F2 other than the thumb F1 by the spring force of the second spring member, whereby the second rotating operation member 17 can be favorably rotated to add a modulation effect, such as vibrato, to musical sound.

In addition, the switch device 10 includes the first attaching member 22 having the first attaching piece 22c for attaching the first rotating operation unit 11 to the instrument main body 1 and the second attaching member 32 having the second attaching piece 32c for attaching the second rotating operation unit 12 to the instrument main body 1. Therefore, the first rotating operation unit 11 that is rotated in the up and down direction of the instrument main body 1 can be favorably and unfailingly attached to the instrument main body 1 by the first attaching member 22, and the second rotating operation unit 12 that is rotated in the horizontal direction of the instrument main body 1 can be favorably and unfailingly attached to the instrument main body 1 by the second attaching member 32.

In this instance, the first attaching piece 22c of the first attaching member 22 and the second attaching piece 32c of the second attaching member 32 are attached on the same plane of the instrument main body 1. Therefore, regardless of the structure where the first rotating operation unit 11 rotates in the up and down direction or the second rotating operation unit 12 rotates in the horizontal direction perpendicular to the first rotating operation unit 11, the first rotating operation unit 11 and the second rotating operation unit 12 can be favorably and unfailingly attached to the instrument main body 1 by the first attaching member 22 and the second attaching member 32.

In addition, in the switch device 10, the adjustment hole 22 for adjusting the space between the first rotating operation unit 11 and the second rotating operation unit 12 is provided in at least the first attaching piece 22c among the first attaching piece 22c and the second attaching piece 32c, whereby the first attaching member 22 can be slid in a direction approaching or moving away from the second attaching member 32, along the adjustment hole 33. As a result, the attachment position of the first attaching member 22 in relation to the instrument main body 1 can be changed, whereby the space between the first rotating operation member 14 and the second rotating operation member 17 can be easily and favorably adjusted. Accordingly, in both cases where the user is an adult with large hands and where the user is a child with small hands, the space between the first rotating operation member 14 and the second rotating operation member 17 can be optimally adjusted.

Moreover, in the switch device 10, the first groove section 26a on which the thumb F1 is placed is obliquely formed on the operating surface 26 of the first rotating operation member 14 in a manner to gradually deepen towards the base side of the thumb F1. Therefore, when rotating the first rotating operation member 14, the thumb F1 can be placed in the first groove section 26a of the operating surface 26, whereby the first rotating operation member 14 can be favorably and unfailingly rotated by the thumb F1.

Similarly, the second groove section 29a on which a finger F2 other than the thumb F1 is placed is obliquely formed on the operating surface 29 of the second rotating operation member 17 in a manner to gradually deepen from the lower side to the upper side. Therefore, when rotating the second rotating operation member 17, a finger F2 other than the thumb F1 can be placed on the second groove section 29a of the operating surface 29, whereby the second rotating operation member 17 can be favorably and unfailingly rotated by a finger F2 other than the thumb F1.

Furthermore, in the switch device 10, the position restricting recess section 30 that restricts the position of a portion of the left hand H is provided in one end section 2a of the upper case 2 of the instrument main body 1, such as on the upper edge portion on the left-hand side of the upper case 2. Accordingly, when the left hand H is placed on the upper edge portion of the end section 2a of the upper case 2, a portion of the left hand H is placed on the position restricting recess section 30 in the upper edge portion of the end section 2a of the upper case 2. As a result, the position of the thumb F1 of the left hand H can be unfailingly restricted corresponding to the first rotating operation unit 11, and the position of a finger F2 of the left hand H other than the thumb F1 can be unfailingly restricted corresponding to the second rotating operation unit 12.

Still further, in the switch device 10, the second rotating operation member 17 is arranged in a manner to be rotatable in the lateral direction (horizontal direction) parallel with the top surface of the upper case 2, with a portion of the operating surface 29 of the second rotating operation member 17 protruding from the notched section 28 provided in one end section 2a of the upper case 2 of the instrument main body 1. Therefore, a finger F2 of the left hand H other than the thumb F1 can be unfailingly and favorably placed corresponding to the second rotating operation unit 12, through the notched section 28 of the end section 2a of the upper case 2, and the second rotating operation unit 12 can be unfailingly and favorably rotated by this finger F2.

In this instance, the scale marking section 31 formed into recesses for indicating a operating position is provided in the notched section 28 of the end section 2a on the left-hand side of the upper case 2 of the instrument main body 1, along the operating surface 29 of the second rotating operation member 17 protruding from within the notched section 28. Therefore, when the second rotating operation member 17 is rotated by a finger F2 of the left hand H other than the thumb F1, the fingertip of this finger F2 touches the scale marking section 31 formed into recesses, whereby the user can tactually confirm the rotation amount of the second rotating operation member 17 without viewing the scale marking section 31. As a result, the user can subtly rotates the second rotating operation member 17 and can accurately and favorably add the modulation effect, such as vibrato, to musical sound.

Figure 12:
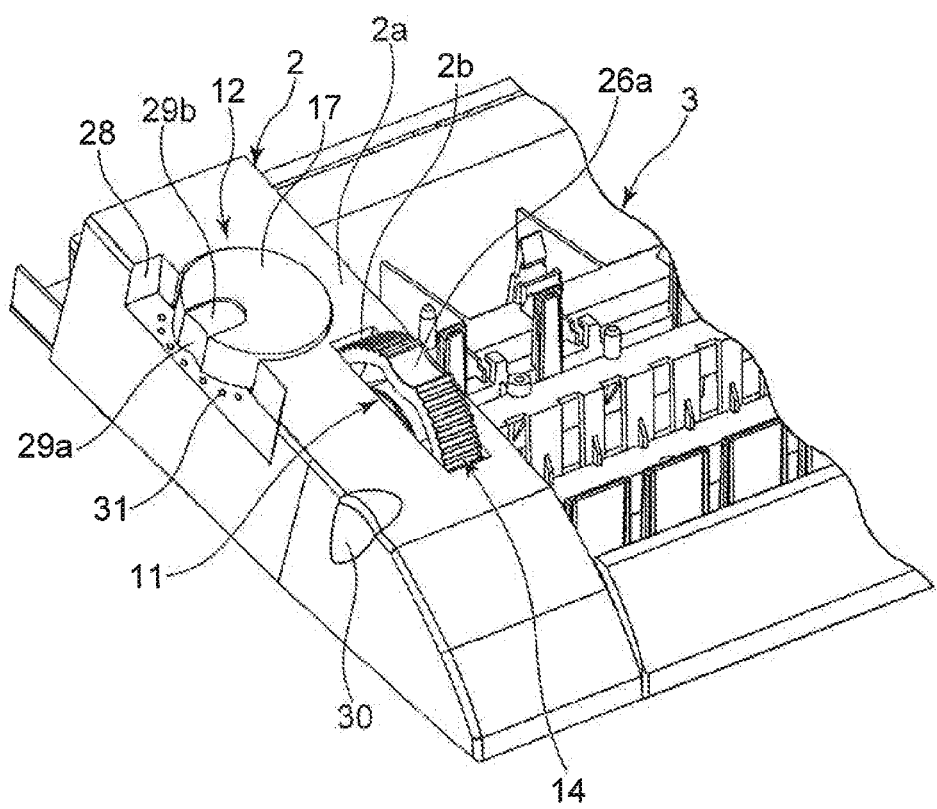
FIG. 12 is an enlarged perspective view showing the main section of a variation example of the switch device in the embodiment where the present invention has been applied to a keyboard instrument.

In the above-described embodiment, the structure has been described in which a portion of the outer peripheral portion of the second rotating operation member 17 of the second rotating operation unit 12 protrudes from the notched section 28 in the end section 2a of the upper case 2, and only the protruding portion is exposed outside of the upper case 2. However, the present invention is not limited thereto, and a structure such as that of a variation example shown in FIG. 12 may be adopted.

Specifically, in the variation example, a portion of the outer peripheral portion of the second rotating operation member 17 protrudes from the notched section 28 in the end section 2a of the upper case 2, and the entire top surface of the second rotating operation member 17 is exposed on the top side of the end section 2a of the upper case 2. In this structure, a first groove section 29a on which a finger F2 of the left hand H other than the thumb F1 (such as the index finger) is placed is provided in a portion of the operating surface 29 in the outer peripheral portion of the second rotating operation member 17. In addition, a second groove section 29b extending from the first groove section 29a to the rotational center of the second rotating operation member 17 is provided on the top surface of the second rotating operation member 17.

As a result, the area of a portion of the second rotating operation member 17 exposed on the upper case 2 increases as compared to that of the above-described embodiment, whereby a finger F2 of the left hand H other than the thumb F1 can more easily touch the second rotating operation member 17. Accordingly, the operability of the second rotating operation member 17 is improved. Also, since the second groove 29b extending from the first groove section 29a to the rotational center of the second rotating operation member 17 is provided on the top surface of the second rotating operation member 17, the operability of the second rotating operation member 17 is further improved.

Also, in the above-described embodiment, the structure has been described in which the scale marking section 31 that indicates the rotation position of the second rotating operation member 17 is formed as recesses on the bottom surface of the notched section 28 in the end section 2a on the left-hand side of the upper case 2. However, the present invention is not limited thereto, and a structure may be adopted in which a scale marking section formed into projections for indicating the rotation position of the second rotating operation member 17 is provided on the bottom surface of the notched section 28 in the end section 2a on the left-hand side of the upper case 2.

Moreover, in the above-described embodiment, the structure has been described in which the elongated adjustment hole 33 is provided in the first attaching piece 22c of the first attaching member 22. However, the present invention is not limited thereto, and a structure may be adopted in which the elongated adjustment hole is provided in the second attaching piece 32c of the second attaching member 32. Alternatively, a structure may be adopted in which the elongated adjustment hole is provided in the attaching piece 22c of the first attaching member 22 and the attaching piece 32c of the second attaching member 32.

Furthermore, in the above-described embodiment, the structure has been described in which the pitch-bend effect is added to musical sound by the first rotating operation unit 11 and the modulation effect is added to musical sound by the second rotating operation unit 12. However, the present invention is not limited thereto, and a structure may be adopted in which the modulation effect is added to musical sound by the first rotating operation unit 11 and the pitch-bend effect is added to musical sound by the second rotating operation unit 12.

Still further, in the above-described embodiment, the structure has been described in which the position restricting recess section 30 formed into a recess is provided in the upper edge portion of one end section 2a of the upper case 2, as a position restricting section for restricting the position of the left hand H. However, the position restricting section is not necessarily required to be formed into a recess, and a position restricting section formed into a projection may be provided instead.

Yet still further, in the above-described embodiment, the structure has been described in which the first rotating operation unit 11 and the second rotating operation unit 12 are provided in the end section 2a on the left-hand side of the upper case 2 of the instrument main body 1. However, the present invention is not limited thereto, and a structure may be adopted in which the first rotating operation unit 11 and the second rotating operation unit 12 are provided in the other side section on the right-hand side of the upper case 2. In this structure, when the right hand is placed on the other side section of the upper case 2, the thumb of the right hand is placed corresponding to the first rotating operation unit 11 and a finger of the right hand other than the thumb is placed corresponding to the second rotating operation unit 12.

In the above-described embodiment and the variation examples, the present invention has been applied to a keyboard instrument. However, the present invention is not necessarily required to be applied to a keyboard instrument and may be applied to various electronic musical instruments. For example, the present invention may be applied to electronic string instruments such as an electric guitar or electronic wind instruments such as a saxophone. Also, the present invention may be applied to audio equipment, such as music players and synthesizers, in addition to electronic musical instruments.

While the present invention has been described with reference to the preferred embodiments, it is intended that the invention be not limited by any of the details of the description therein but includes all the embodiments which fall within the scope of the appended claims.

What is claimed is:

1. A switch device comprising:
   a first rotating operation unit which is rotatably arranged in one side section of an instrument case such that a portion thereof protrudes from a top surface of the instrument case;
   a second rotating operation unit which is rotatably arranged posterior to and separated from the first rotating operation unit such that a portion thereof is exposed on a side surface side of the one side section, and positioned such that the exposed portion is rotatable in a horizontal direction by a finger of one hand other than a thumb when the protruded portion of the first rotating operation unit is rotated in an up and down direction by the thumb;
   a first attaching member having a first attaching piece for attaching the first rotating operation unit to the instrument case at a first position of the instrument case; and
   a second attaching member having a second attaching piece for attaching the second rotating operation unit to the instrument case at a second position of the instrument case which is different from the first position,
   wherein the first attaching piece and the second attaching piece are attached on a same plane in the instrument case.

2. The switch device according to claim 1, wherein the first rotating operation unit has a first rotating operation member that rotates in the up and down direction in relation to the top surface of the instrument case, and a first groove configured to have the thumb placed obliquely thereon is formed in an operating surface of the first rotating operation member and is shaped to gradually deepen towards a base side of the thumb; and
   wherein the second rotating operation unit has a second rotating operation member that rotates in the horizontal direction, which is parallel with the top surface of the instrument case, and a second groove section configured to have the other finger placed thereon is obliquely formed in an operating surface of the second rotating operation member and gradually deepens from a lower side to an upper side.

3. The switch device according to claim 1, wherein the one side section of the instrument case has a position restricting section provided in an upper edge portion thereof which restricts a position of a portion of the one hand.

4. The switch device according to claim 1, wherein at least one of the first attaching piece and the second attaching piece is provided with an adjustment hole for adjusting a space between the first rotating operation unit and the second rotating operation unit.

5. The switch device according to claim 4, wherein the second rotating operation member is arranged in a manner to be rotatable in the horizontal direction parallel with the top surface of the instrument case in a state where a portion of operating surface of the second rotating operation member protrudes from a notched section in the one side section of the instrument case and is exposed to outside of the instrument case.

6. The switch device according to claim 5, wherein the notched section provided in the one side section of the instrument case has a scale marking section that comprises recesses and projections for indicating an operating position and is provided along the operating surface of the second rotating operation member protruding from the notched section.

* * * * *